United States Patent [19]

Blanken et al.

[11] 4,201,812

[45] May 6, 1980

[54] BITUMINOUS CARPET BACKING

[75] Inventors: Thomas C. Blanken; Joannes C. A. Schellekens, both of Amsterdam, Netherlands

[73] Assignee: Shell Oil Company, Houston, Tex.

[21] Appl. No.: 49,380

[22] Filed: Jun. 18, 1979

[30] Foreign Application Priority Data

Jul. 4, 1978 [NL] Netherlands ......................... 7807224

[51] Int. Cl.$^2$ ...................... C08H 13/08; C08F 43/00
[52] U.S. Cl. ......................................... 428/95; 428/96; 428/97; 428/290; 428/291; 428/489
[58] Field of Search .................... 428/95, 96, 97, 290, 428/291, 489

[56] References Cited

U.S. PATENT DOCUMENTS

| Re. 28,236 | 11/1974 | Hendricks | 36/2.5 R |
| 3,594,452 | 7/1971 | De La Mare | 260/880 |
| 3,595,942 | 7/1971 | Wald | 260/880 |

FOREIGN PATENT DOCUMENTS 1925785  1/1971  Fed. Rep. of Germany .
1284726  8/1972  United Kingdom .

*Primary Examiner*—Marion McCamish
*Attorney, Agent, or Firm*—Dean F. Vance

[57] ABSTRACT

Fibrous floor coverings comprising a layer of fibrous fabric having an integral backing layer are disclosed. The backing layer comprises the blend of a certain bituminous component and a monoalkenyl arene/conjugated diene block copolymer.

11 Claims, No Drawings

BITUMINOUS CARPET BACKING

BACKGROUND OF THE INVENTION

Woven and non-woven fabrics are well known fibrous materials for use in floor coverings such as carpets, carpet tiles, rugs and the like. It is also known to provide certain floor coverings, especially the non-woven types such as felt or tufted floor coverings, with an integral backing layer to protect the floor covering against wear and to improve its dimensional stability. It is important that these floor coverings having integral backing layers be sufficiently flexible to prevent cracks forming in the backing layer during transport, storage and laying operations. Further, after laying the backing layer must be able to withstand heavy loads without the surface remaining indented for an undesirable length of time after the heavy load has been removed.

SUMMARY OF THE INVENTION

The present invention covers a fibrous floor covering comprising a layer of a fibrous fabric having an integral backing layer, said backing layer comprising the blend of:
  (a) from about 50 to about 95 percent of a bituminous component having a penetration of below about 30 (0.1 mm) at 25° C., and
  (b) from about 5 to about 50% by weight of a block copolymer having at least two monoalkenyl arene polymer end blocks A and at least one elastomeric conjugated diene mid block B.

The bituminous layer may optionally also contain a wax in order to reduce the stickiness of the compound.

Floor coverings according to the present invention not only posses good flexibility, they also have excellent indentation characteristics. This combination of property advantages is especially important and is a non-obvious property advantage.

DETAILED DESCRIPTION OF THE INVENTION

The bituminous component comprises a bitumen derived from a mineral oil as well as naturally occurring bitumens. Examples of suitable bitumens include precipitation bitumens, e.g. propane bitumens, blown bitumens, e.g. blown propane bitumens, and mixtures thereof. The bituminous binder may also comprise extenders such as petroleum extracts e.g. aromatic extracts, distillates or residues. The bituminous component may also contain a wax. Suitable waxes are those having a congealing point of from 50° to 70° C. Suitable amounts of wax are from 0.1 to 75%w, preferably from 5 to 60%w, based on the weight of bitumen present in the bituminous component. Animal, insect, vegetable, synthetic and mineral waxes may be used with those derived from mineral oils being preferred. Examples of mineral oil waxes include bright stock slack wax, medium machine oil slack wax, high melting point waxes and microcrystalline waxes. In the case of slack waxes up to 25%w of oil may be present. Additives to increase the congealing point of the wax may also be present. As stated above, the bituminous component has a penetration of below 30 (0.1 mm) at 25° C. Preferably it has a penetration of from 1 to 25 (0.1 mm) at 25° C.

The block copolymers employed in the present composition are thermoplastic elastomers and have at least two monoalkenyl arene polymer end blocks A and at least one elastomeric conjugated diene polymer mid block B. The number of blocks in the block copolymer is not of special importance and the macromolecular configuration may be linear, graft or radial (branched) depending upon the method by which the block copolymer is formed. Typical block copolymers of the most simple configuration would have the structure polystyrene-polyisoprene-polystyrene and polystyrene-polybutadiene-polystyrene. A typical radial polymer would comprise one in which the diene block has three or more branches, the tip of each branch being connected to a polystyrene block. See U.S. Pat. No. 3,594,452. Expressed another way, the invention also contemplates (but is not limited to) the use of configurations such as A—B—(B—A)$_n$ where n varies from 1 to 5. Other useful monoalkenyl arenes from which the thermoplastic (non-elastomeric) blocks may be formed include alphamethyl styrene, tertbutyl styrene and other ring alkylated styrenes as well as mixtures of the same. The conjugated diene monomer preferably has 4 to 5 carbon atoms, such as butadiene and isoprene.

The average molecular weights of each of the blocks may be varied as desired. The monoalkenyl arene polymer blocks preferably have average molecular weights between about 2,000 and about 125,000, more preferably between about 15,000 and about 100,000. The elastomeric conjugated diene polymer blocks preferably have average molecular weights between about 15,000 and about 250,000, more preferably between about 25,000 and about 150,000. The average molecular weights of the polystyrene end blocks are determined by gel permeation chromatography, whereas the polystyrene content of the polymer is measured by infrared spectroscopy of the finished block polymer. The weight percentage of the thermoplastic monoalkenyl arene blocks in the finished block polymer should be between about 8 and 70%, preferably between about 20% and about 50% by weight. The general type and preparation of these block copolymers are described in U.S. Pat. No. Re. 28,236 and in many other U.S. and foreign patents.

The block copolymers useful in the compositions of this invention may also be hydrogenated either selectively, randomly or completely. Preferably, however, the block copolymers are not hydrogenated. Selected conditions may be employed, for example, to hydrogenate the elastomeric diene center block while not so modifying the monoalkenyl arene polymer blocks. Two examples of hydrogenated polymers are polyvinylcyclohexane-hydrogenated polyisoprene-polyvinylcyclohexane and polystyrene-hydrogenated polybutadiene-polystyrene. Preferably, blocks A are characterized in that no more than about 25% of the original aromatic double bonds are reduced by hydrogenation while blocks B are characterized by having at least 75% of the aliphatic double bonds reduced by hydrogenation. See generally U.S. Pat. No. 3,595,942.

The backing layer may also contain an inorganic filler. Suitable fillers include fly ash, asbestos, siliceous fillers such as silicates, and calcareous fillers. The preferred fillers are slate dust and/or limestone. Mixtures of different filler may be used. Suitable amounts of inorganic filler are from 1 to 400%w, preferably from 50 to 250%w, based on weight of the bituminous component and block copolymer. The backing layer may also be colored by adding pigments thereto.

As stated above, the present invention is particularly suitable for non-woven fibrous floor coverings such as felts or tufted floor coverings which may have been prepared by techniques such as needle punching into a backing which is usually a woven fabric. The fibrous floor covering may be composed of natural and/or synthetic fibers. In some cases is it conventional practice to provide the underside of the floor covering with a back coating the essential function of which is adhesive. This so-called primary coating is usually carried out with polymers in latex. The integral backing layer according to the present invention may be applied to the fibrous floor covering, which may or may not have been provided with a primary coating, by any convenient technique. Suitably the bitumen is melted and the other components mixed therein and the resultant mixture, while still easily handleable, applied to the fibrous floor covering by pouring and spreading the mixture onto the back of the floor covering or by passing the covering over a roller partly immersed in the mixture. Alternatively the backing layer may be prepared as a separate layer and stuck or welded to the back of the floor covering.

The invention will now be illustrated with reference to the following examples.

EXAMPLES

Various backing compositions, the formulations of which are given in the Table, were prepared and applied while the bituminous component and copolymer were in the molten state to the backs of tufted carpets to provide backing layers having thicknesses of 1 to 2.5 mm. The tufted carpets having such backing layers showed acceptable flexibility and acceptable indentation characteristics.

In the examples the components used had the following properties. (The penetrations are determined by ASTM D5-61 and softening points by ASTM D36-26).

Bitumen in Examples 1 to 3: A propane bitumen having a penetration of 7.5 (0.1 mm) at 25° C.

Bitumen in Example 4: A mixture of propane bitumen (80% w) and a blown propane bitumen (20% w), the mixture having a penetration of 5 (0.1 mm) at 25° C.

Bitumen in Example 5: A propane bitumen having a penetration of 16 (0.1 mm) at 25° C.

Bitumen in Example 6: A propane bitumen having a penetration of 7 (0.1 mm) at 25° C.

Wax in Examples 1 to 4: A medium machine oil slack wax having a congealing point of 63° C. and an oil content of 9.2%.

Copolymer in Examples 1 to 6: A styrene-butadiene-styrene-block copolymer having a molecular weight distribution of 16,000-74,000-16,000.

Slate dust in Examples 2 and 4: Slate dust filler with 96%w of particles having size of from 20 to 149μ.

Limestone in Examples 3, 5 and 6: Limestone filler with 85%w of particles having size below 74μ.

The various compositions are shown below in Table 1. The bitumen, wax and block copolymer are expressed as percent by weight, the total adding up to 100 percent. The values for the fillers are expressed as parts by weight per 100 parts of the bitumen, wax, copolymer blends.

Table 1

| Example | Bituminous Component Bitumen 90 w | Wax 90 w | Penetration at 25° C. (0.1 mm) | Block Copolymer 90 w | Filler Slate dust | Limestone |
|---|---|---|---|---|---|---|
| 1 | 75 | 10 | 19 | 15 | — | — |
| 2 | 75 | 10 | 19 | 15 | 150 | — |
| 3 | 75 | 10 | 19 | 15 | — | 150 |
| 4 | 59.1 | 26.7 | 20 | 14.2 | 150 | — |
| 5 | 85 | — | 16 | 15 | — | 150 |
| 6 | 85 | — | 7 | 15 | — | 100 |

What is claimed is:

1. A fibrous floor covering comprising a layer of a fibrous fabric having an integral backing layer, said backing layer comprising the blend of:
   (a) from about 50 to about 95 percent of a bituminous component having a penetration of below about 30 (0.1 mm) at 25° C., and
   (b) from about 5 to about 50% by weight of a block copolymer having at least two monoalkenyl arene polymer end blocks A and at least one elastomeric conjugated diene mid block B.

2. The fibrous floor covering of claim 1 wherein said bitumen is selected from the group consisting of propane bitumens, blown propane bitumens and mixtures thereof.

3. The fibrous floor covering of claim 1 wherein said bitumen has a penetration of from about 1 to about 25 (0.1 mm) at 25° C.

4. The fibrous floor covering according to claim 1 wherein the bituminous component also contains from 0.1 to 75 percent by weight based on the weight of the bitumen of a wax.

5. The fibrous floor covering according to claim 1 wherein the wax has a congealing point of from 50° to 70° C.

6. The fibrous floor covering according to claim 1 wherein the polymer blocks A of the block copolymer have a molecular weight of from 2,000 to 125,000 and the polymer block B has a molecular weight of from 15,000 to 250,000.

7. The fibrous floor covering according to claim 6 wherein the block copolymer is a polystyrene-polybutadiene-polystyrene block copolymer.

8. The fibrous floor covering according to claim 1 wherein the amount of bituminous component is from 74 to 90%w and the amount of block copolymer is from 5 to 50%w.

9. The fibrous floor covering according to claim 1 wherein the backing layer also contains an inorganic filler.

10. The fibrous floor covering according to claim 9 wherein the filler is selected from the group consisting of slate dust, limestone or mixtures thereof.

11. The fibrous floor covering according to claim 10 wherein the amount of filler is from 1 to 400%w based on the total weight of the bituminous component and block copolymer.

* * * * *